United States Patent
Bushmitch et al.

(10) Patent No.: US 7,761,571 B2
(45) Date of Patent: Jul. 20, 2010

(54) SIP SERVICE FOR HOME NETWORK DEVICE AND SERVICE MOBILITY

(75) Inventors: Dennis Bushmitch, Somerset, NJ (US); Alan Kaplan, Princeton, NJ (US); Wanrong Lin, Princeton, NJ (US)

(73) Assignee: Panasonic Corporation, Osaka (JP)

( * ) Notice: Subject to any disclaimer, the term of this patent is extended or adjusted under 35 U.S.C. 154(b) by 1765 days.

(21) Appl. No.: 10/894,469

(22) Filed: Jul. 19, 2004

(65) Prior Publication Data

US 2005/0114491 A1 May 26, 2005

Related U.S. Application Data

(60) Provisional application No. 60/524,599, filed on Nov. 25, 2003.

(51) Int. Cl.
*G06F 15/173* (2006.01)
*G06F 15/16* (2006.01)

(52) U.S. Cl. .................... 709/226; 709/227; 709/230

(58) Field of Classification Search ................ 709/224, 709/226, 230, 246, 227
See application file for complete search history.

(56) References Cited

U.S. PATENT DOCUMENTS

| | | | | |
|---|---|---|---|---|
| 6,823,364 B1* | 11/2004 | Sollee et al. | ................ | 709/205 |
| 6,826,167 B2* | 11/2004 | Osafune et al. | ............. | 370/338 |
| 6,857,021 B1* | 2/2005 | Schuster et al. | ............. | 709/227 |
| 6,996,087 B2* | 2/2006 | Ejzak | .......................... | 370/338 |
| 7,002,989 B2* | 2/2006 | Agrawal et al. | ............. | 370/467 |
| 7,028,092 B2* | 4/2006 | MeLampy et al. | .......... | 709/230 |
| 7,035,923 B1* | 4/2006 | Yoakum et al. | ............. | 709/224 |
| 7,072,332 B2* | 7/2006 | D'Souza | .................... | 370/352 |
| 7,100,166 B2* | 8/2006 | Takatama et al. | ........... | 719/318 |
| 7,103,644 B1* | 9/2006 | Zhang et al. | ................ | 709/219 |
| 7,149,506 B2* | 12/2006 | Osterhout et al. | ........... | 455/417 |
| 7,170,863 B1* | 1/2007 | Denman et al. | ............. | 370/260 |
| 7,185,091 B2* | 2/2007 | Dorenbosch et al. | ........ | 709/224 |
| 7,243,162 B2* | 7/2007 | O'Neill et al. | .............. | 709/245 |
| 7,293,271 B2* | 11/2007 | Trossen et al. | ............. | 719/318 |
| 2002/0103850 A1* | 8/2002 | Moyer et al. | ................ | 709/202 |
| 2002/0103898 A1* | 8/2002 | Moyer et al. | ................ | 709/224 |
| 2002/0147814 A1* | 10/2002 | Kimchi et al. | ............. | 709/226 |
| 2003/0028669 A1* | 2/2003 | Batsleer et al. | ............. | 709/240 |
| 2003/0187992 A1* | 10/2003 | Steenfeldt et al. | ........... | 709/227 |
| 2004/0128344 A1* | 7/2004 | Trossen | ...................... | 709/203 |
| 2004/0249951 A1* | 12/2004 | Grabelsky et al. | ........... | 709/227 |
| 2004/0255302 A1* | 12/2004 | Trossen | ...................... | 719/318 |

OTHER PUBLICATIONS

Daqing Zhang, "A New Service Delivery and Provisioning Architecture for Home Appliances", Consumer Electronic, 2003, ICCE. 2003 IEEE International Conference.

* cited by examiner

*Primary Examiner*—William C Vaughn, Jr.
*Assistant Examiner*—Kristie D Shingles
(74) *Attorney, Agent, or Firm*—Harness, Dickey & Pierce, P.L.C.

(57) ABSTRACT

An improved services gateway environment is provided within a gateway framework. The improvement comprising a SIP service architecture that enables SIP entities to register with itself and translates such registrations into gateway aware registrations.

21 Claims, 7 Drawing Sheets

SIP SERVICE FOR HOME NETWORK DEVICE AND SERVICE MOBILITY

CROSS-REFERENCE TO RELATED APPLICATIONS

This application claims the benefit of U.S. Provisional Application No. 60/524,599, filed on Nov. 25, 2003. The disclosure of the above application is incorporated herein by reference.

FIELD OF THE INVENTION

The present invention relates to a middleware framework for home gateways, and more particularly to a SIP service architecture for extending a service gateway framework, such as OSGi.

BACKGROUND OF THE INVENTION

The evolution of both mobile and home networking technologies offers opportunities for supporting the interoperation between mobile devices and devices residing in a home network. By interoperation, we mean the ability for mobile devices, such as cell phones and PDAs, to discover, connect, control and interact with devices in a home, such as PVRs, televisions and cameras.

In the mobile domain, the expected transition to an all-IP wireless infrastructure means that SIP (Session Initiation Protocol) is likely to be employed by next-generation mobile devices. Although originally intended for session management for Voice over IP, SIP is becoming increasingly popular in other applications. These applications can be traced to SIP's support for device mobility and location independence, wide area service mobility and strengthened security. SIP also supports event notification, which is critical for device control applications. Examples of applications based on SIP include device control, device/service capability negotiation and instant messaging and presence.

In the home networking domain, various low-level home networking technologies and protocols are proliferating the market. Examples include 1394, Bluetooth, 802.11 and X10. To help manage the diversity and heterogeneity inherent in home networks, frameworks, such as OSGi (Open Services Gateway Initiative), are being defined in various standard organizations. Specifically, OSGi is a Java-based framework that supports the delivery, activation and execution of services (called bundles) to home networks. All services can be managed remotely, thus allowing service providers to adapt their products to a consumer's needs while keeping these products up to date. OSGi is independent of lower-level communication protocols and provides a middleware layer that can accommodate a variety networking technologies. For example, an OSGi-compliant platform can integrate both TCP/IP- and Bluetooth-connected devices, or provide internetworking between UPnP devices and Jini devices.

Therefore, a SIP device communication service is proposed for the OSGi framework. Extending OSGi to handle a SIP device facilitates communication between SIP devices/ services and other OSGi-based services. In general, this extension allows any OSGi bundle to interact with a registered SIP device/service. As a result, a SIP device/service is able to interact with other OSGi devices/services, such as UPnP or Jini devices. For example, a SIP mobile phone can act as a remote control for UPnP-enabled audio/video equipment or for Jini-enabled printers, which provides the ability to access music and video stored on a UPnP home media server, or to print images on a Jini printer.

Allowing an OSGi device's functionality to be exported into a mobile environment means that devices and services in a home environment gain network-independent service mobility. Bundles can selectively export OSGi devices' functionalities as enabled by various OSGi services into the mobile SIP device/service representation. Because of its flexibility, SIP transport and eventing do not generally restrict exportation of devices functionality. Such exportation becomes strictly a function of the bundle, which implements SIP user agent and exports OSGi device functions. An example of such SIP-enabled feature exportation, bundle that communicates with local UPnP device can export its "evented" state changes into mobile domain by implementing SIP event notification. This further makes part of UPnP device functionality importable into other OSGi frameworks, as SIP Service allows SIP device importation.

SUMMARY OF THE INVENTION

In accordance with the present invention, an improved services gateway environment is provided within a gateway framework. The improvement comprising a SIP service architecture that enables SIP entities to register with itself and translates such registrations into gateway aware registrations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
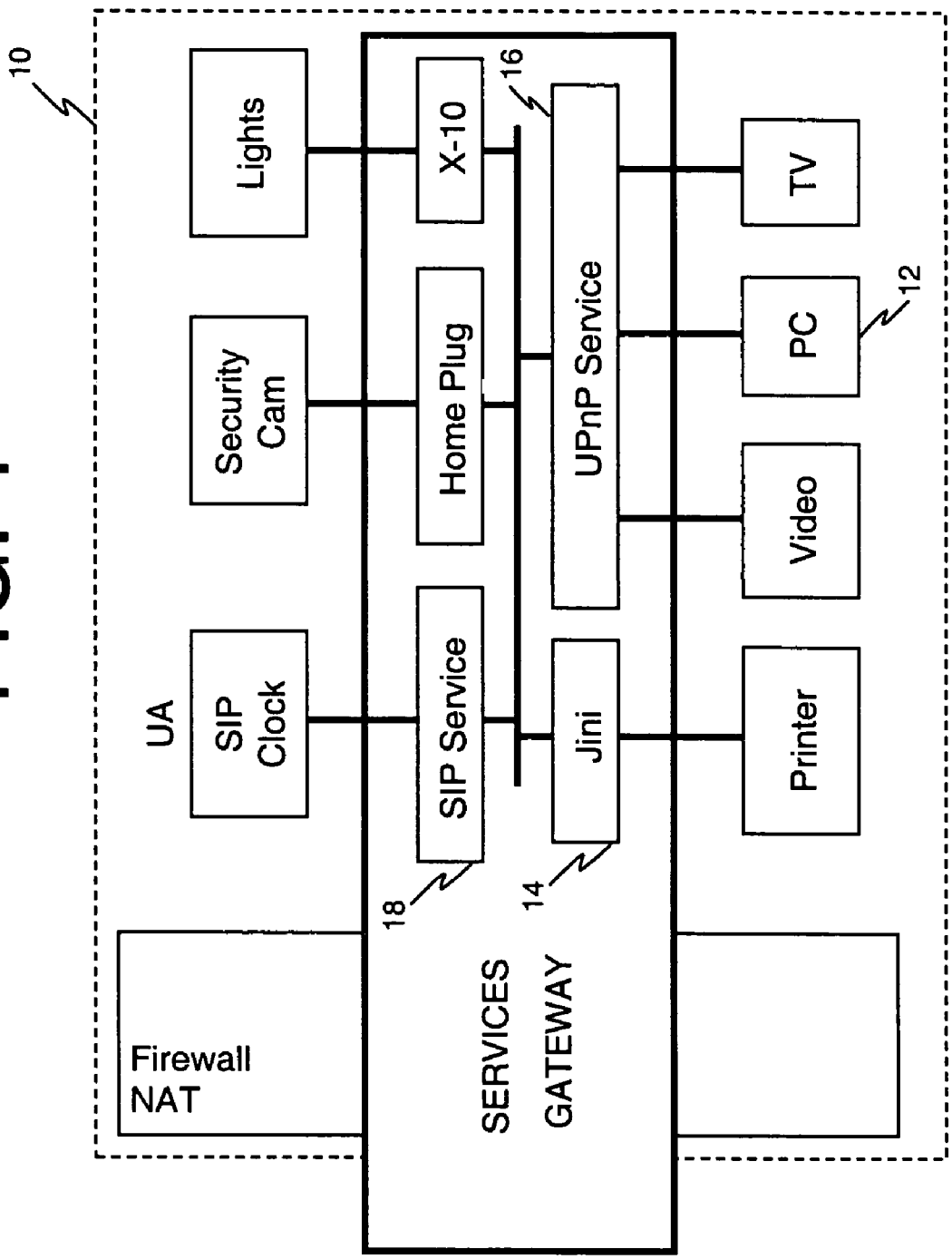
FIG. 1 depicts an exemplary architecture for an OSGi-compliant home gateway.

FIG. 1 illustrates an exemplary architecture for an OSGi-compliant home gateway 10. OSGi is a Java-based framework for delivering services to residential users over a network. In a service gateway environment, applications are designed as a set of services, with each service implementing a segment of the overall functionality. These services and other extension services are then packaged into an executable component commonly referred to as a bundle. The gateway can download a requested bundle when it becomes necessary. The framework handles basic bundle management functionality. In order to share its services with other bundles, a bundle can register any number of services with the framework. While the following description is provided with reference to an OSGi framework, it is readily understood that the broader aspects of the present invention encompass other gateway specifications.

The OSGi-compliant gateway 10 typically has several home networking devices 12 registered with it. It is understood that a device may be a piece of software or hardware, as long as there exists a record of the device and its category in the OSGi device service registry. Gateway-enabled devices may be using several different networking technologies and rely on various OSGi services and bridging bundles to enable seamless internetworking among them. Exemplary services may include a Jini service 14 and a UPnP service 16. OSGi services provide native device discovery and communication features, while registering devices with an OSGi device service registry and enabling devices' functionality via standardized APIs.

To utilize the present invention, a SIP service architecture 18 (also referred to herein as the SIP service) is proposed for the OSGi framework. Session initiation protocol (SIP) is a well known call setup and management protocol for multimedia communication. The proposed SIP service architecture 18 is defined in accordance with the session initiation protocol (SIP). Briefly, the SIP service architecture 18 enables SIP entities to register with itself and translates such registrations into gateway aware registrations.

The SIP Service 18 exposes three main interfaces which deal with SIP-specific functions, such as registrations, eventing and messaging, as well as OSGi-specific functions, such as SIP device registration with the framework's registry. The three main interfaces include SIPServer, SIPDevice and SIPUserAgent. Each interface enables different functionalities of the SIP service as further described below. The SIP Service is immediately available to any OSGi bundle that wishes to use it, as long as the bundle instantiates an instance of the SIPUserAgent interface, which would enable this bundle to act as a SIP User Agent (SIP UA).

Figure 2:
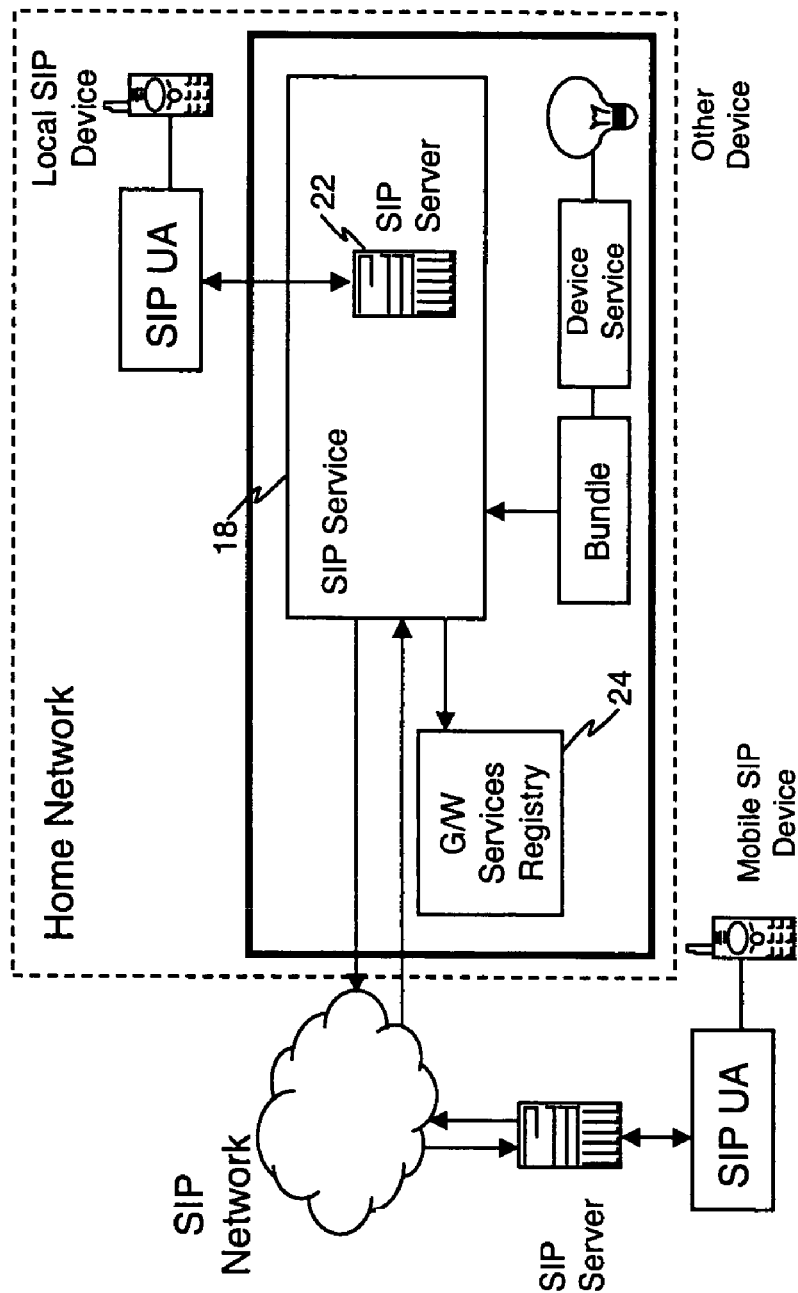
FIG. 2 depicts a SIP service architecture incorporated into an OSGi home gateway environment in accordance with the present invention.

Referring to FIG. 2, the SIP service 18 is an OSGi bundle that operates according to the driver-like model of the OSGi Device Access Service. The SIP service 18 enables SIP device registrations, notifications and messaging. In order to provide functionalities outlined above within the OSGi environment, the SIP service 18 instantiates a SIP registrar/proxy server 22, which registers any SIP devices trying to access an OSGi home network. The SIP server 22 also actively proxies SIP messages when such SIP devices become mobile. SIP service 18 will also register all SIP devices with the OSGi framework device registry 24, assigning them a proper category as "SIP Device". Any bundle wishing to communicate with some SIP device of interest, can thus access OSGi device service registry, locate devices of "SIP Device" category, and then use the available interfaces or APIs of the proposed SIP Service.

Figure 3:
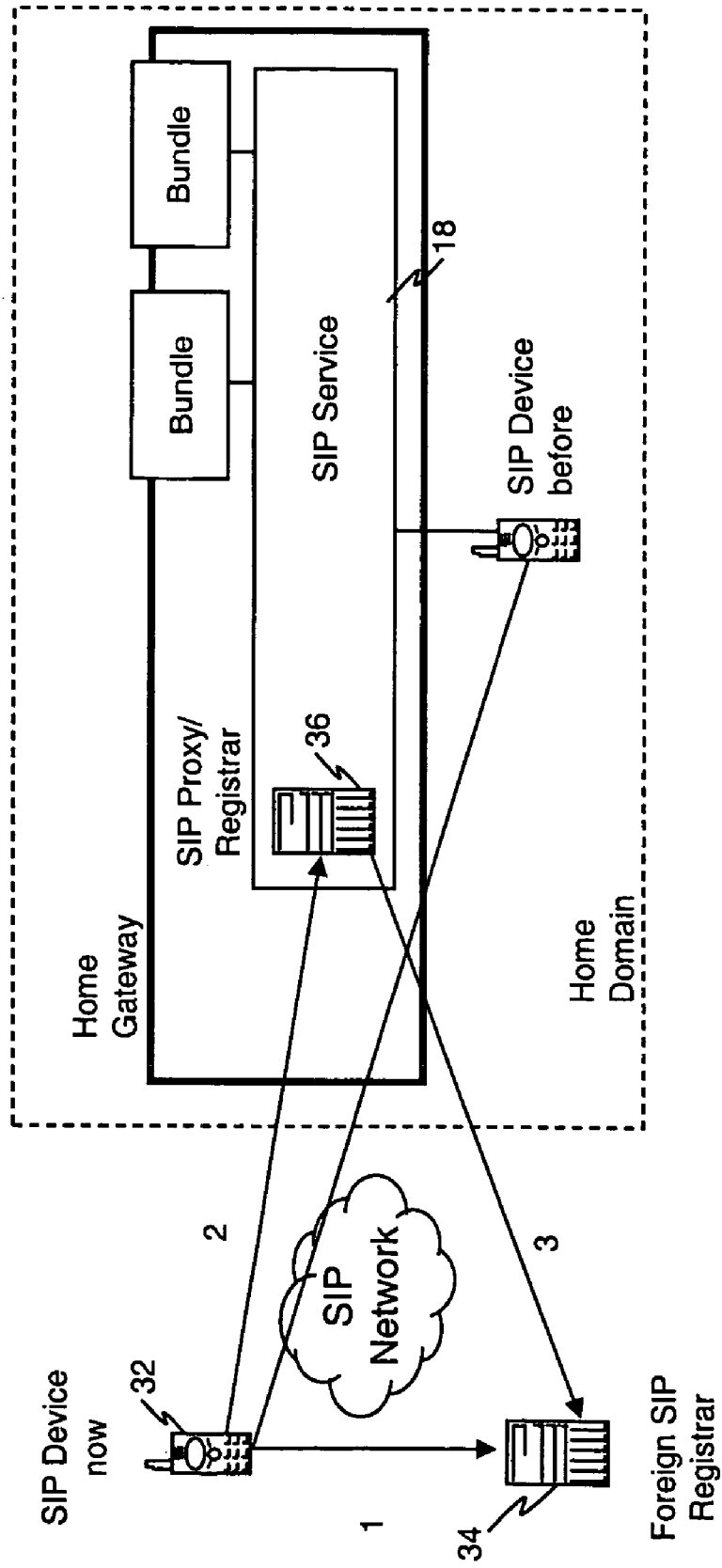
FIG. 3 illustrates an exemplary methodology for supporting device mobility between at least two gateway environments in accordance with the SIP service architecture of the present invention.

This proposed service architecture can handle any SIP requests/messages independent of whether the SIP device is located locally or has moved to a new location and registered with a different SIP registrar server. If a SIP device 32 relocates or moves to a different domain, the following steps need to be followed by the device as shown in FIG. 3. First, the SIP device 32 obtains an IP address from the DHCP server at the new location device as well as register with the local SIP registrar server 34 as shown in step 1. Next, the device 32 needs to update its location information with its home-based SIP server 36 to indicate its new location as shown at step 2. However, the home registrar server can be unaware of the exact location of the device in the visited domain. Lastly, the home registrar and proxy will redirect all SIP messages from the SIP service to the proxy server in the visited domain as shown at step 3. This allows for a roaming device to change its IP address if device is changing location within the sub-domains of the visited network. The presence of another OSGi gateway in a visiting domain is purely optional. SIP Service would normally continue to send and to receive SIP messages via its SIP proxy. The above-described functionality is typical of SIP application layer mobility that is utilized by the proposed SIP Service.

Figure 4:
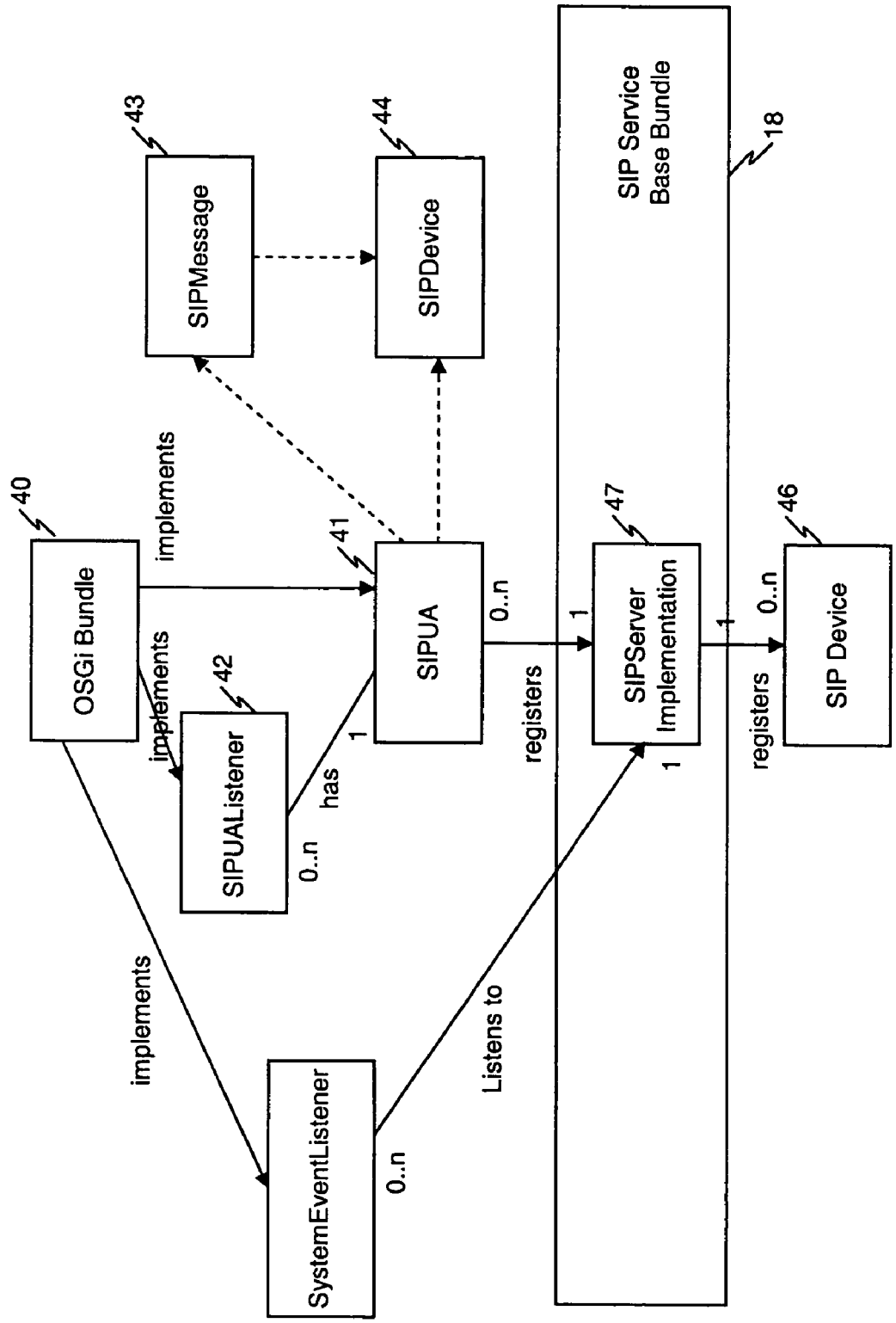
FIG. 4 depicts an exemplary class diagram for the SIP service architecture of the present invention.

FIG. 4 illustrates an exemplary class diagram for the SIP service architecture of the present invention. The main entities of the classes represent some of the entities available through the SIP Service bundle(s). Any OSGi bundle 40 can act as a SIP UA by instantiating a SIPUA object 41. A SIP UA can have several SIPUAListener objects 42 in order to assign an event listener to each of the other SIP entities it wishes to communicate with. In addition, a bundle can create and send SIP messages by instantiating those via SIPMessage objects 43 and then using them through the SIPUA 41 and the SIPUAListener 42 interfaces. The SIPDevice class 44 acts as an object reference to a SIP device, registered with SIP Service and thus enabled under the OSGi. Any third party SIP device 46 or an application can register with the OSGi Framework by sending a request to the SIP Server 47 (i.e., associated with an instance of SIP Service). SIP Service then registers the SIP entity with the OSGi device service registry.

SIPServer class object represents the previously mentioned SIP Server (Proxy/Registrar) for the home OSGi gateway domain. There is only one instance of a SIPServer and it is implemented as a singleton class. Using a SIP Server interface, an application (bundle) can create a SIPUserAgent object that represents a generic SIP user agent. SIP user agent is automatically registered with SIP server (not to confuse with SIPServer class or objects) after its creation. The OSGi SIP service treats this registered user agent as a "virtual" SIP device. The name "virtual SIP device" implies that no physical device exists, rather an application bundle behaves as a valid (or "proper") SIP UA. More about distinctions between real and virtual SIP devices will be discussed below. Using the SIPUserAgent object, the application bundle has the full access to SIP protocol functionalities needed for a valid SIP UA. Bundle has to maintain the SIP-session interaction rules to be considered valid in a SIP protocol sense UA.

An application bundle can also obtain a SIPDevice (i.e., SIP device reference) object handle for any registered with OSGi Framework (or equivalently SIP Service's SIP server) SIP device, given its OSGi device registration ID (i.e., ID present in OSGi's device service registry). The OSGi SIP Service is responsible for maintaining entries in OSGi device service registration database for all registered with its SIP server and therefore, OSGi Framework, SIP devices, including both, virtual and real SIP devices.

Lastly, an application can be notified of the SIP Service system-specific events as well as obtain the home domain name. SIP Service System events include events such as, devices being registered or unregistered with the SIP Service's SIP server.

As mentioned earlier, once the SIP Service driver is started by the OSGi framework, an instance of a SIP server must be instantiated. This SIP server acts as a Registrar or a Proxy server for the home network SIP devices and messages destined to the mobile SIP devices. The SIP Service will then register all registered with the SIP server SIP devices with the OSGi framework device registry, assigning them a proper category that of a "SIP Device". The SIPServer will also have a valid SIP Address, so it can be contacted from a SIP network for SIP entities' registrations, proxying of various SIP messages, etc.

Any bundle wishing to communicate with some SIP device of interest, can access OSGi device service registry, locate devices of the "SIP Device" category, and then use a function from the SIPServer API to retrieve the object's handle corresponding to this SIP device SIPDevice object.

SIPDevice references a registered with the SIP server and the OSGi Framework SIP device, which may be also a virtual SIP device. Using this interface, an application bundle can retrieve the information about a SIP device, such as its SIP address, category (virtual or real SIP UA), and capabilities, etc. In addition, an application bundle can use SIPDevice object handle in SIP message communication functions of the SIPUserAgent interface in order to address the SIP device of interest.

There are two distinctly different types of SIP devices. The first type is comprised of the physical SIP devices, which posses valid SIP User Agents (UAs) and usually are independent network entities. Such UAs, normally register themselves with the SIP server started by the SIP Service. The second type of device is a virtual SIP device; that is any OSGi executable bundle, which by utilizing the proposed SIP Service API SIPUserAgent interface, behaves as a valid SIP UA. Both types of SIP devices are registered with SIP server, and have valid SIP URLs. Virtual devices have URLs of the form: sip:OSGi_bundle_ID@gw.home.net, while physical SIP devices have URLs of the sample form: sip:devManufacturer_ID@gw.home.net.

SIPDevice objects represent both, virtual and physical SIP devices. When SIPDevice objects represent two virtual SIP devices, SIP Service's SIPUserAgent interface provides an additional capability for any two bundles located either on the same gateway or on two different gateways to communicate with each other in the same manner that any two SIP entities can communicate, i.e., with all implications of SIP-enabled mobility, eventing and security features. To take advantage of this mobile communication feature, bundle needs to instantiate the SIP UA functionality utilizing the SIP Service SIPUserAgent API.

By using the SIPUserAgent interface, a bundle can use SIP methods (i.e., protocol methods) to facilitate communication between itself and other real or virtual SIP UAs. These can be requests, acknowledgements or one-way messages, depending on the SIPUserAgent's interface methods called. Using SIPUserAgent interface, bundle can become a valid SIP UA, enabling its communication with other SIPDevice objects.

The distinction between SIPUserAgent and SIPDevice can be described as follows. SIPUserAgent represents a SIP User Agent (UA) that an application bundle owns (i.e. the application has full control and defines the behavior of the agent). SIPDevice objects represent references to those SIP agents registered in the home domain that an application can access by sending/receiving SIP messages to/from. Therefore, a SIPUserAgent can be references by a SIPDevice object in the eyes of another SIP user agent.

When two different bundles instantiate the instances of SIPUserAgent objects, they can effectively communicate with each other using SIPUserAgent message communication functions, as long as valid handles to these UAs are obtained using SIPServer and SIPDevice APIs. These bundles can be located on the same or different OSGi-enabled gateways. Naturally, a virtual SIP device of one gateway can be registered with another OSGi gateway and represented with its SIP Service infrastructure as a SIPDevice object, thus enabling cross-gateway service/device importation/exportation functionality.

Any OSGi bundle that needs to communicate with another SIP UA has to instantiate at least one instance of SIPUserAgent. SIPUserAgent represents a generic SIP user agent. An application can create a SIPUserAgent object only through the SIPServer interface. After creating a SIPUserAgent object, an application can act as a SIP user agent and will be referenced as a SIPDevice object within the SIP Service. The SIPUserAgent interface provides methods to access SIP UA-related functionalities. Specifically, the SIPUserAgent interface provides methods for an application to create SIPMessage and SIPAddress objects; methods for an application to send and receive generic SIP messages; and methods for applications to conveniently access those SIP functionalities that are heavily used in SIP device control, such as subscription to events and sending messages that carry control information. This set of methods can be extended as more standardization work in SIP device control is finished. The SIP transaction layer is included in the implementation of the SIPUserAgent interface. The two-way communication between two SIP UAs is achieved by using both, SIPUserAgent and SIPUAListener interfaces. Examples demonstrating how an application could utilize some of the SIP service interfaces described above are set forth in Appendix A.

Figure 5:
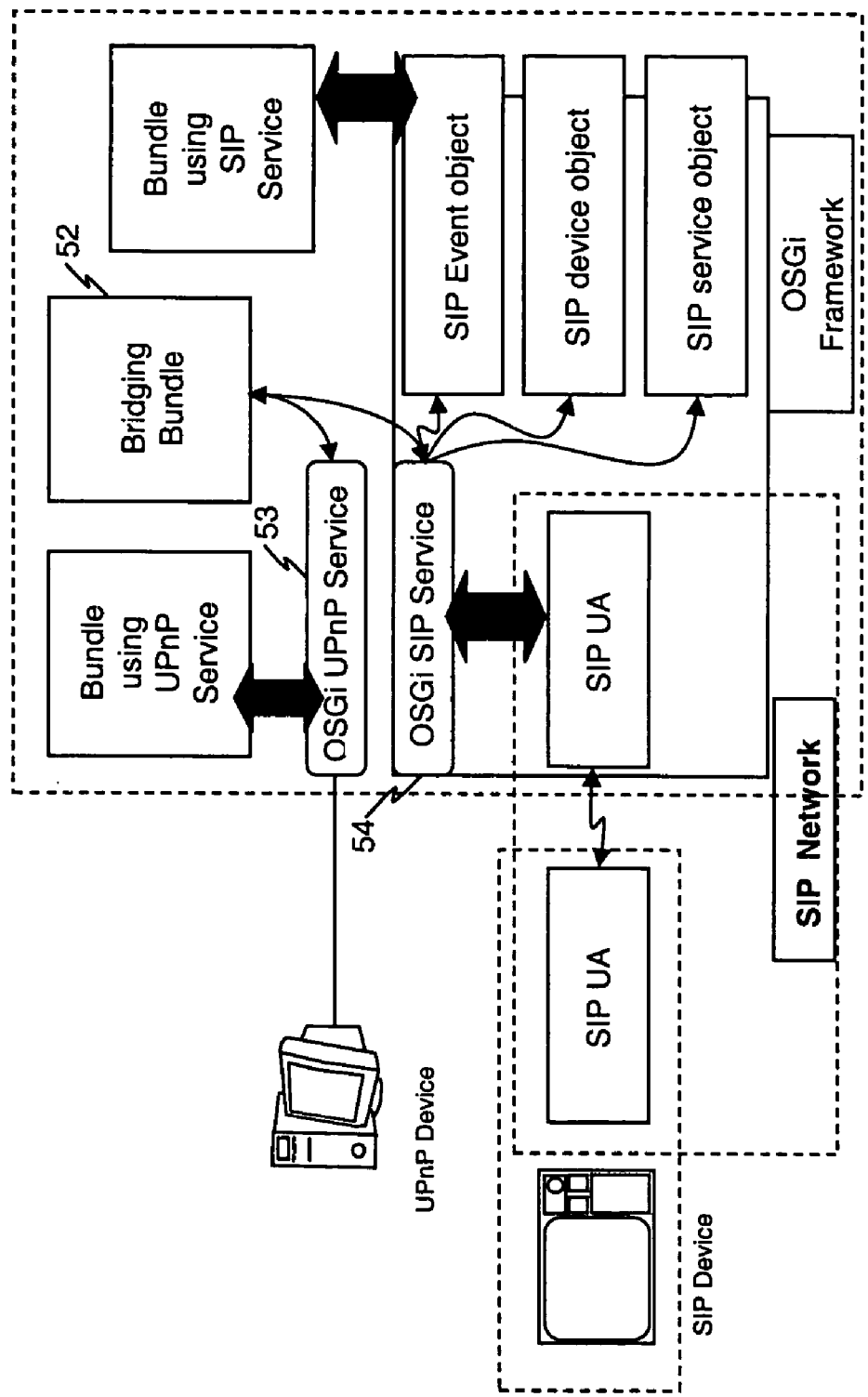
FIG. 5 illustrates an exemplary bridging bundle for performing application layer bridging within the context of the SIP service architecture of the present invention.

To translate between diverse device frameworks, a so-called bridging bundle is needed to perform the application layer bridging. For example, a bridging bundle 52 between UPnP and SIP frameworks will utilize both, UPnP services 53 and SIP OSGi services 54 as shown in FIG. 5. It would obtain UPnP and SIP device reference objects and translate UPnP events into SIP event notification, and vise-versa. It will encapsulate UPnP SOAP control messages into SIP MESSAGE messages, with appropriate message payload and header translations.

Bridging bundle could create custom type SIP messages corresponding to other framework (e.g., UPnP) control and event messages. Alternatively, when available via the corresponding device control framework service API, the entire messages of another device communication framework, could be encapsulated into SIP MESSAGE method payloads or SIP event notification messages. Then, SIP protocol utilizing the proposed Service API becomes a mobile transport/eventing protocol for any generalized type of communication between the device and its driver bundles.

Figure 6:
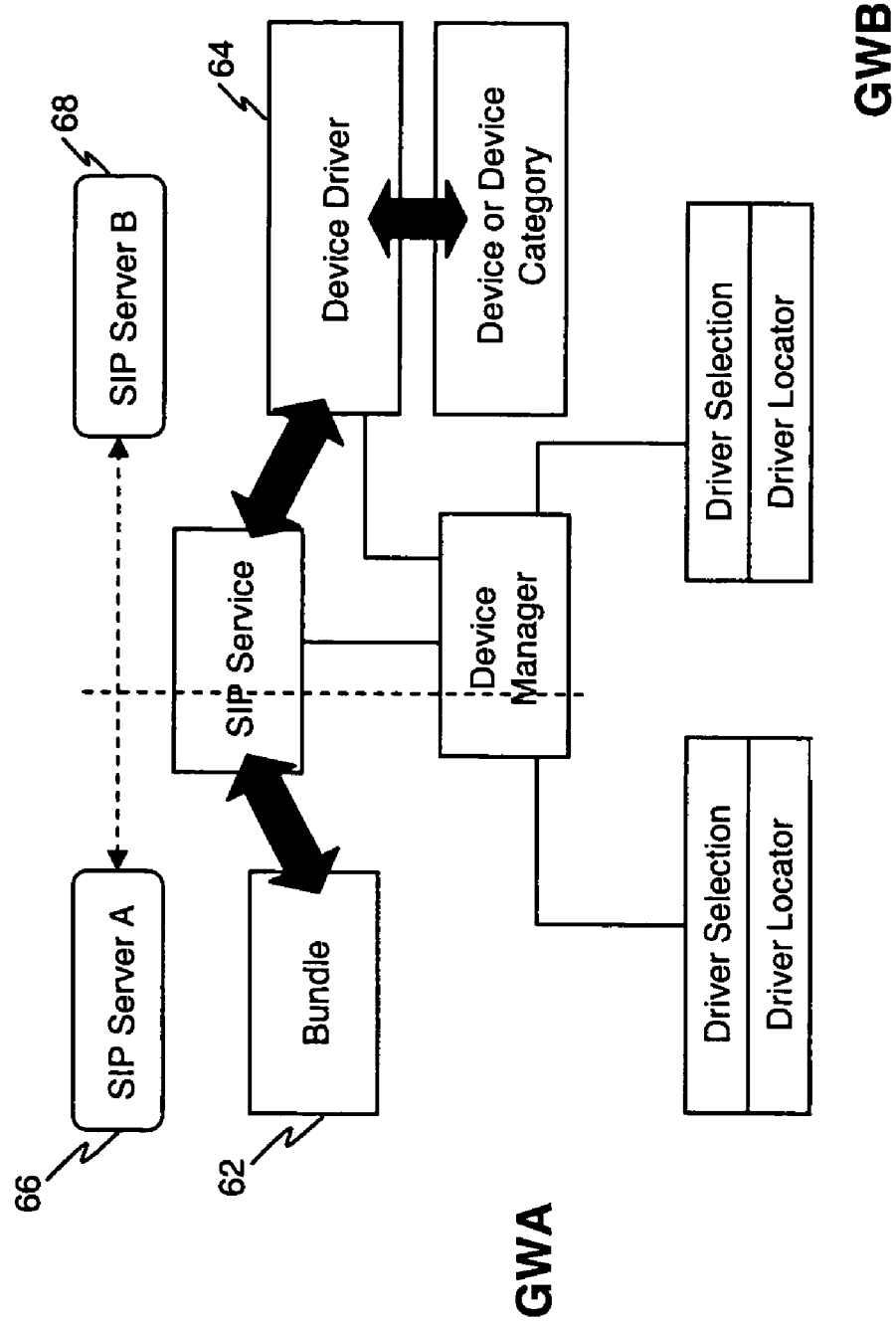
FIGS. 6 and 7 illustrate an exemplary device access model which employs the SIP service architecture of the present invention.
Figure 7:
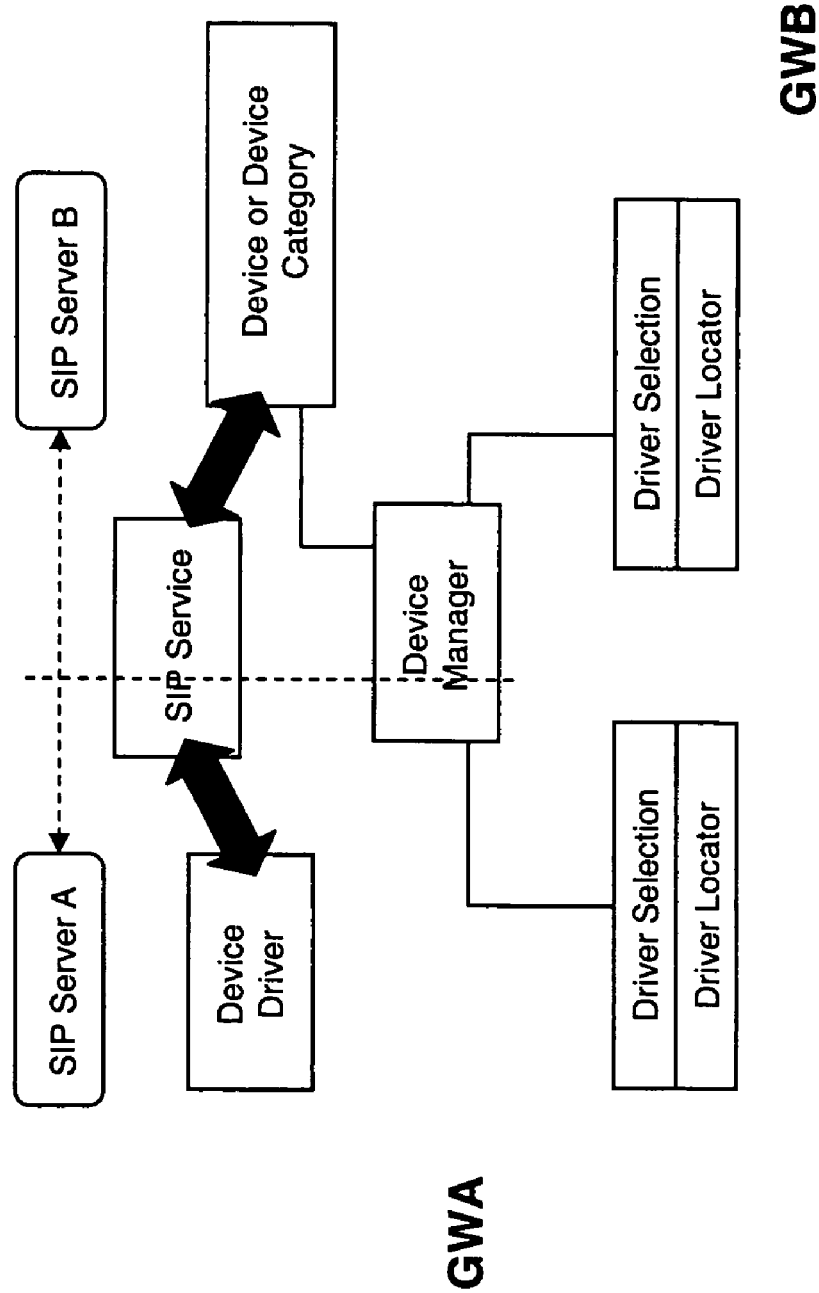

In another aspect of the present invention, the SIP service architecture described above supports a device access model for communicating between entities residing on different gateways. Referring to FIG. 6, an application bundle 62 residing on a gateway A may be able to send messages to a mobile device driver service 64 residing on a different gateway B. The SIP service architecture 66 exposes an interface to the gateway framework which allows messages to be carried automatically between the application and the device driver service using session initiation protocol (SIP). Likewise, a SIP service architecture 68 associated with gateway B exposes an interface which allows messages to be carried between the application from the device driver service. While the above described device access model has been described in term of an application and a device driver service, it is readily understood that this model may be used to support communication between other gateway entities. For instance, a device access model for communicating between a device driver service and a device is shown in FIG. 7.

The description of the invention is merely exemplary in nature and, thus, variations that do not depart from the gist of the invention are intended to be within the scope of the invention. Such variations are not to be regarded as a departure from the spirit and scope of the invention.

APPENDIX A

The following example demonstrates how an application could use the SIP Service interfaces in order to retrieve a list that includes all registered SIP UA's (i.e., SIP devices) with the SIP Server, as well as how to create a SIP message and send it to one of the SIP devices:

```
import org.osgi.sip.*;
public class OSGiSIPServiceExample{
/* the reference to the singleton SIPServer instance */
private SIPServer myServer;
/* the reference to the SIPUserAgent object which this bundle owns */
private SIPUserAgent myUserAgent;
/* a reference to a SIPUAListerner object which this bundle owns */
private String bundleName;
/* the name for the virtual device which myAgent represents */
private String myVirtualDeviceName;
* the reference to the SIP Address of the message creator */
private SIPAddress fromAddress;
* the reference to the SIP Address of the message receiver */
private SIPAddress toAddress;
* other data */
/* main data entry point */
public static void mainProcess( ) {
  /* gets the singleton instance of SIPServer*/
  server = SIPServer.getInstance( ) ;
  /* retrieves the list of all registered SIP devices in a SIPDevice array */
  SIPDevice[ ] allSIPDevices = server.getRegisteredSIPDevice( ) ;
  /* selects the device that we want to control from the array of allSipDevices and
  put its SIPDevice reference into deviceToControl */
  SIPDevice deviceToControl;
  /* selects the device we want to control and extracts its SIP address */
  toAddress deviceToControl.getDeviceAddress( ) ;
  /* creates a SIP UA Listener to handle the messages from other SIP devices */
  private class SIPMessageHandler implements SIPUAListener{
    public void processMessage(SIPMessage message, String transactionID){
    /* the bundle can implement here its processing of the SIP requests received
    from other SIP devices, such as determining whether to honor the request and
    sending a response */
    }
    public void processResponse(SIPMessage response, String transactionID){
    /* the bundle can implement here its processing of the SIP responses received
    from other SIP devices */
    }
    public SIPMessage createReply(SIPMessage response, String transactionID){
    /* the bundle can implement here its processing of the SIP responses received
    from other SIP devices */
    }
  }
  /* creates a SIPUserAgent object which this bundle can utilize to access the SIP
  functionalities. The created SIP user agent will be automatically registered with
  the SIP server and be treated as a "virtual SIP device" */
  myUserAgent = server.createSIPUserAgent(myVirtualDeviceName, bundleName,
  "virtual");
  /* creates an instance of SIPUAListener and attaches it to the SIPUserAgent
  object. When an incoming SIP message arrives, the processRequest or
  processResponse method of messageHandler is invoked. In those two methods the
  bundle can conduct its own processings of the received SIP messages */
  SIPMessageHandler mySIPMessageHandler = new SIPMessageHandler( ) ;
  myUserAgent.addSIPListener(mySIPMessageHandler);
  /* creates a reference of our SIP address and addigns it our address */
  fromAddress = myUserAgent.createAddress("vasilis @ unl.ac.uk");
  /* a new message of MESSAGE type is being created */
  SIPMessage msg = myUserAgent.createRequest("MESSAGE",fromAddress,toAddress);
  /* creates a XML formatted device control message and puts it into
  deviceControlMessage. This message contains the control information for the SIP
  device to be controlled and will be carried in the body of a SIP MESSAGE request
  */
  msg.setBody(".....");
  /* we can also set other SIP fields here */
  /* now we send the message to the device we wish to control */
  myUserAgent.sendMessage(msg);
  /* other application methods can follow here */
```

The SIP Server needs to register all available SIP devices with the OSGi registry. These devices are registered as services under a SIPDevice interface with the OSGi Framework. An example of registering a service is shown below.

```
public interface SIPUA {
/* implementation goes here */
}
Public interface SIPUAListener {
/* implementation goes here */
}
Public class OurSIPDevice implements SIPUAListener, SIPUA {
/* implementation goes here */
}
String [ ] names = {"SIPUAListener", "SIPUA"};
Java.util.Dictionary dict = new Dictionary( );
/* set the keys and the elements of the dictionary. These include: Service
Description (virtual/real SIP device), Service ID, Service PID, Service Ranking,
Service Vendor */
ServiceRegistration reg = context.registerService(names, new OurSIPDevice( ), dict);
/* the registration of the Service takes place */
In order to use a remote SIPDevice the available SIP Device services need to be traced through
the OSGi service registry. The following sample code shows how the ServiceTracker class can
be extended in order to export all available SIP Devices into a controller application.
import org.osgi.util.tracker.ServiceTracker;
import org.osgi.framework.*;
class Controller extends ServiceTracker {
  CA ca; // controller application
Controller(BundleContext content){
  super(context, SIPDevice.class.getName( ), null);
}
public Object addingService(ServiceReference ref) {
  SIPDevice sd = (SIPDevice)super.addingService(ref);
  ca.adDevice(dev);
  return dev;
}
public void modifiesDevice(ServiceReference ref, Object dev) {
  ca.modifyDevice((SIPDevice) dev);
}
public void removedDevice(ServiceReference ref, Object dev) {
  ca.removeDevice((SIPDevice) dev);
```

What is claimed is:

1. A services gateway environment having a plurality of available services within a gateway defined in accordance with a service gateway specification, comprising:
a SIP service defined in accordance with Session Initiation Protocol that instantiates a registration server on a computer device in the gateway, where the registration server registers SIP entities with itself and translates such registrations into registrations with a service registry of the gateway defined in accordance with the service gateway specification, where the SIP service is embodied as computer executable instructions in a memory of the computing device and the service registry provides a directory for the plurality of available services.

2. The services gateway environment of claim 1 wherein said SIP service exposes at least one of device discovery, service discovery, device control, service control, device event notification and service event notification to gateway-enabled devices and services.

3. The services gateway environment of claim 1 wherein said SIP service instantiates an instance of a SIP registration/proxy server, said SIP registration/proxy server offering registration to SIP entities.

4. The services gateway environment of claim 3 wherein said SIP service automatically instantiates an instance of the SIP registration/proxy server.

5. The services gateway environment of claim 1 wherein said SIP service instantiates an instance of a SIP registration/proxy server, said SIP registration/proxy server operable to proxy messages between mobile SIP devices and SIP entities associated with the gateway environment.

6. The services gateway environment of claim 3 wherein an execution bundle instantiates a SIP User Agent using an interface provided by said SIP service architecture, thereby enabling the execution bundle to act as a SIP capable entity.

7. The services gateway environment of claim 6 wherein the SIP registration/proxy server automatically registers the SIP User Agent with itself and with the service registry.

8. The services gateway environment of claim 1 wherein a given device registers with the SIP service architecture as a SIP-enabled device.

9. The services gateway environment of claim 1 wherein the gateway is further defined in accordance with an Open Services Gateway Initiative (OSGi) specification, such that the SIP service is registered with and discoverable via an OSGi service registry.

10. The services gateway environment of claim 1 wherein the gateway is further defined in accordance with an Open Services Gateway Initiative (OSGi) specification, such that SIP service architecture enables registration of SIP-enabled entities with an OSGi service registry.

11. The services gateway environment of claim 1 wherein a SIP capable entity is accessible to one of the available services via a gateway service discovery and inter-service communication framework.

12. The services gateway environment of claim 3 wherein a mobile SIP device registers with the SIP registration/proxy server and provides its location information to an originating SIP registration/proxy server association with its originating gateway environment, so that messages received by the originating SIP registration/proxy server are redirected to the mobile SIP device.

13. A services gateway environment having a plurality of available services associated with a home gateway defined in accordance with a service gateway specification, comprising:
 a SIP service having an interface for instantiating SIP User Agents and operable to instantiate a SIP registration server within the services gateway environment; wherein the SIP registration server automatically registers the SIP User Agents with itself and translates said registrations of the SIP User Agents into registrations with a service registry for the home gateway, where the SIP service is defined in accordance with Session Initiation Protocol and embodied as computer executable instructions on a memory of a computing device in the home gateway.

14. The services gateway environment of claim 13 wherein a SIP capable entity is accessible to one of the available services via a gateway service discovery and inter-service communication framework.

15. The services gateway environment of claim 13 wherein the home gateway is further defined in accordance with an Open Services Gateway Initiative (OSGi) specification, such that the SIP capable entity is registered with an OSGi service registry.

16. A computer-implemented method for supporting device mobility between at least two service gateway environments, each gateway environment having a plurality of available services defined in accordance with a service gateway specification, comprising:
 registering a SIP registration/proxy server with a service registry defined in accordance with a service gateway specification;
 registering a SIP-enabled device with the SIP registration/proxy server instantiated in a first gateway environment;
 registering the SIP-enabled device with a SIP registration/proxy server instantiated in a second gateway environment upon the device moving from the first gateway environment to the second gateway environment;
 obtaining location information for the SIP-enabled device at the second gateway environment; and
 registering the location information for the SIP-enabled device with the SIP registration/proxy server in the first gateway environment.

17. The method of claim 16 further comprises redirecting messages received at the SIP registration/proxy server in the first gateway environment to the SIP-enabled device in the second gateway environment.

18. A device access system for communicating between entities residing on different gateways, comprising:
 an application bundle residing in a first gateway;
 a SIP service defined in accordance with Session Initiation Protocol that is accessible to the application bundle and associated with the first gateway;
 a registration server on a computing device in the first gateway instantiated by the SIP service, where the registration server registers SIP entities with itself and translates such registrations into registrations with a service registry of the first gateway;
 a device driver service residing in a second gateway;
 another SIP service defined in accordance with Session Initiation Protocol that is accessible to the device driver service and associated with the second gateway, wherein each of the SIP services expose an interface which allows messages to be carried automatically between the application bundle and the device driver service.

19. The device access system of claim 18 wherein messages are formatted in accordance with session initiation protocol (SIP).

20. A device access system for communicating between entities residing on different gateways, comprising:
 a device driver service residing in a first gateway;
 a SIP service defined in accordance with Session Initiation Protocol that is accessible to the application bundle and associated with the first gateway;
 a registration server on a computing device in the first gateway instantiated by the SIP service, where the registration server registers SIP entities with itself and translates such registrations into registrations with a service registry of the first gateway;
 a device residing in a second gateway;
 another SIP service defined in accordance with Session Initiation Protocol that is accessible to the device and associated with the second gateway, wherein each of the SIP services expose an interface which allows messages to be carried automatically between the device driver service and the device.

21. The device access system of claim 20 wherein messages are formatted in accordance with session initiation protocol (SIP).

* * * * *